United States Patent [19]

Inoue et al.

[11] Patent Number: 4,820,801

[45] Date of Patent: Apr. 11, 1989

[54] POLYPHENYLENE SULFIDE CONTAINING COVALENTLY BONDED CHLORINE IN A REDUCED AMOUNT

[75] Inventors: Hiroshi Inoue; Toshikazu Kato; Masaaki Otsuru, all of Shinnanyo; Noriaki Emura, Tokuyama, Japan

[73] Assignees: Tosoh Corp.; Hodogaya Chemical Co., Ltd., both of Japan

[21] Appl. No.: 924,915

[22] Filed: Oct. 29, 1986

[30] Foreign Application Priority Data

Nov. 2, 1985 [JP] Japan .................................. 60-245318
Dec. 12, 1985 [JP] Japan .................................. 60-277913

[51] Int. Cl.$^4$ .............................................. C08G 75/14
[52] U.S. Cl. ...................................... 528/388; 528/374
[58] Field of Search ................................. 528/388, 374

[56] References Cited

U.S. PATENT DOCUMENTS

| | | | |
|---|---|---|---|
| 3,386,950 | 6/1968 | Horvath et al. | 260/45.7 |
| 3,723,362 | 4/1973 | Walker | 260/79 |
| 4,490,522 | 12/1984 | Kawabata et al. | 528/388 |
| 4,507,468 | 3/1985 | Kawabata et al. | 528/388 |

FOREIGN PATENT DOCUMENTS 59-45323 3/1984 Japan.

OTHER PUBLICATIONS

Chemical Abstracts, vol. 90, 6869v, 1979.

*Primary Examiner*—Harold D. Anderson
*Attorney, Agent, or Firm*—Kenyon & Kenyon

[57] ABSTRACT

A highly modified polyphenylene sulfide (hereinafter refer to as "PPS") which contains covalently bonded chlorine in a far less amount than conventional PPS's and is substantially free from ionically bonded chlorine and sodium, is produced by heat-treating a conventional PPS with at least one of organic, sulfur-containing compounds in a solvent capable of dissolving the PPS. Such a PPS is very useful as a coating or encapsulating material for electrical and electronic components, etc.

2 Claims, 2 Drawing Sheets

POLYPHENYLENE SULFIDE CONTAINING COVALENTLY BONDED CHLORINE IN A REDUCED AMOUNT

BACKGROUND OF THE INVENTION

1. Field of the Invention

This invention relates to a polyphenylene sulfide containing covalently bonded chlorine in an amount of 500 ppm or less, as well as to a process for producing said polyphenylene sulfide. Polyphenylene sulfide (hereinafter abbreviated to "PPS"), having excellent heat resistance and excellent chemical resistance, is widely used in electrical or electronic components, automotive or other mechanical parts, etc. Being moldable into a shaped article, a film, a sheet, a fiber, etc. by means of injection molding, extrusion molding, etc., the applications of PPS have been rapidly expanding in recent years.

2. Description of the Prior Art

Japanese Patent Publication No. 3368/1970 discloses a general process for producing a PPS, wherein an alkali metal sulfide is heated in an aprotic polar solvent to free water of crystallization from the alkali metal sulfide and then a dihalobenzene is added, followed by thermal polymerization. Japanese Patent Publication No. 12240/1977 discloses a process for producing a PPS of high polymerization degree, wherein an alkali metal salt of a carboxylic acid is added as a polymerization aid.

In these processes of PPS production, sodium chloride is formed as a by-product in an amount approximately the same as that of a desired polymer, namely, PPS. This makes it difficult to completely remove sodium chloride from the PPS with an ordinary treatment such as water washing. Moreover, the PPS contains chlorine and sodium bonded to its polymer chain terminals. As a result, commercially available PPS's contain about 1,000 to 3,000 ppm of sodium and about 2,000 to 4,000 ppm of chlorine. When a shaped article made from such a PPS is used in electrical or electronic components, the components have deteriorated electrical characteristics due to the large amounts of sodium and chlorine contained in the PPS and this causes big problem. For instance, when a PPS containing large amounts of sodium and chlorine is used for sealing of electronic components such as integrated circuits or the like, it is known that said sodium and chlorine reduce, due to their hydroscopy, the insulating properties of circuits or cause the corrosion of electrodes and lead frames, this leading to wire breakage, and thus characteristic deterioration and failure of the elements is induced.

In order to improve the above drawbacks, Japanese Patent Public Disclosure (Laid-Open Publication) No. 156342/1980 discloses a method wherein a PPS powder is subjected to extraction with hot water several times to reduce the content of water-extractable sodium to 100 ppm or lower. However, a study by the present inventors on this method revealed that repeated extraction over a very long time removed only sodium present on the surface or in the surface layer of PPS polymer particles and the polymer particles after extraction still contained 1,000 ppm or more of sodium. Thus, the efficiency of sodium removal by this method was low. Further, the PPS purified by the above method was measured for the content of covalently bonded chlorine present therein, and this indicated the presence of about 2,000 to 3,000 ppm of covalently bonded chlorine. Hence, no effect representative of the reduction of covalently bonded chlorine could be seen in the PPS.

Japanese Patent Public Disclosure (Laid-Open Publication) No. 219331/1984 discloses a method wherein a PPS is heat-treated in an aromatic solvent to reduce the sodium content. In this method, reduction of sodium content was possible but the PPS after heat treatment contained about 2,000 to 3,000 ppm of covalently bonded chlorine. Therefore, there was no effect representative of the reduction of covalently bonded chlorine.

As stated above, in the purification of PPS by conventional methods, reduction of sodium content is possible but the content of covalently bonded chlorine cannot be reduced. Therefore, PPS's made in conventional production processes have not been fully satisfactory for use as coating or encapsulating materials for electrical or electronic components.

SUMMARY OF THE INVENTION

It is therefore an object of the present invention to provide a novel PPS substantially free from ionically bonded sodium and chlorine and containing an extremely low level of covalently bonded chlorine, as well as a process for producing said PPS.

Other objects and advantages of the present invention will become apparent to those skilled in the art from the following description and disclosure.

DETAILED DESCRIPTION OF THE PREFERRED EMBODIMENT

Figure 1:
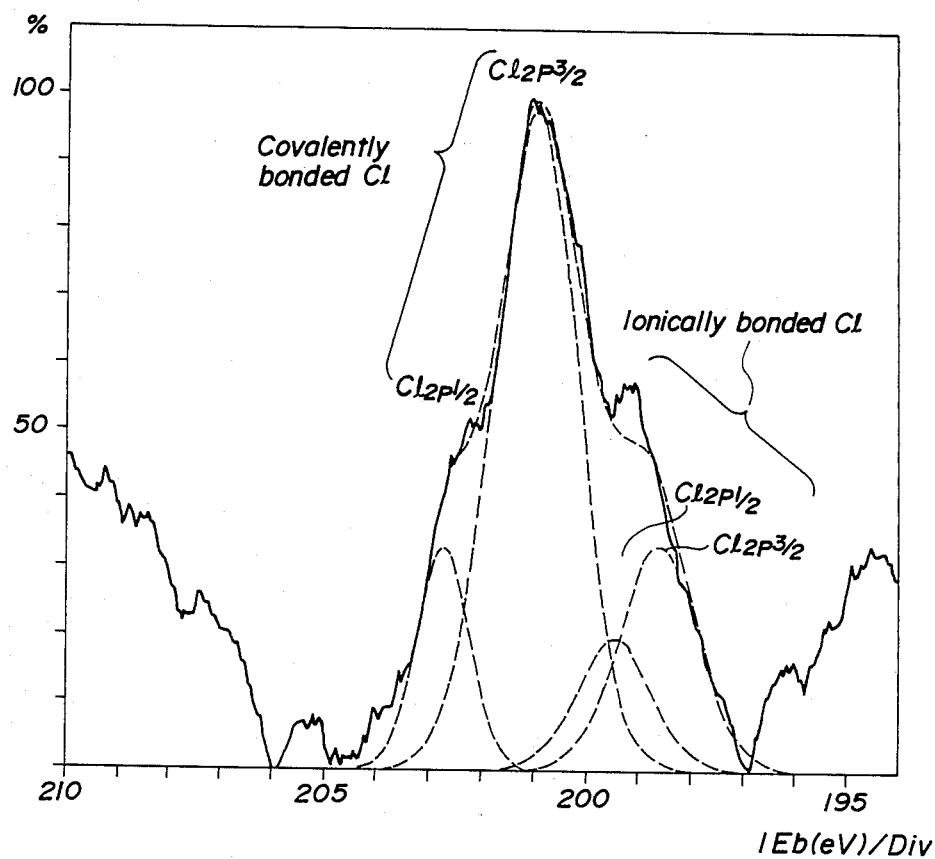
FIG. 1 shows an ESCA (electron spectroscopy for chemical analysis) spectrum of chlorine (covalently bonded chlorine and ionically bonded chlorine) in a PPS produced according to a known process and used in the following Examples as a raw material.

The present invention relates to a novel PPS containing covalently bonded chlorine in an amount of 500 ppm or less, as well as to a process for producing said PPS. The covalently bonded chlorine referred to in the present invention is the covalently bonded chlorine which bonds directly to the carbon atoms of PPS and is not the ionically bonded chlorine which can be removed according to an ordinary method, such as that which is contained in PPS in the form of NaCl or the like. The covalently bonded chlorine bonds to the benzene ring at the terminal of PPS polymer chain and is specifically indicated as follows.

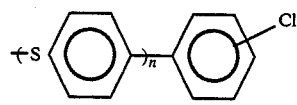

This covalently bonded chlorine does not include the chlorine of residual dichlorobenzene monomer. The covalently bonded chlorine contained in PPS can be determined by firstly determining the sum of covalently bonded chlorine and ionically bonded chlorine according to ion chromatography or the like and then determining the ratio of covalently bonded chlorine and ionically bonded chlorine according to ESCA.

It is necessary that the PPS of the present invention containing covalently bonded chlorine in a reduced amount be at least 90 mole %, preferably at least 95 mole % of a poly(p-phenylene sulfide) consisting of a recurring unit represented by

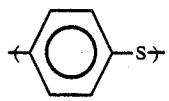

and the remainder of a copolymerizable component. As for such copolymerizable unit, there can be mentioned o- or m-phenylene bond, biphenylene bond, naphthalene bond, tri- or tetra-valent phenylene bond, etc. The PPS of the present invention can also be an oxidized and crosslinked PPS obtained by subjecting the above PPS to heat treatment in the presence of oxygen. The PPS of the present invention has a polymerization degree n of preferably 20 to 5,000. The PPS of the present invention further has a melt viscosity of preferably 10 to 50,000 poises when measured at 300° C. at a load of 10 kg using a Koba type flow tester (die hole diameter: 0.5 mm, die hole length: 2 mm).

The process for producing a highly modified PPS of the present invention will be specifically explained below.

The PPS of the present invention containing covalently bonded chlorine in a reduced amount can be produced by reacting an alkali metal sulfide and a halobenzene to produce PPS and then heat-treating said PPS with at least one of the two organic, sulfur-containing compounds represented by the general formulas (I) and (II) ps

(wherein R and R' may be the same or different and are each a hydrocarbon type group of 1 to 20 carbon atoms such as alkyl, cycloalkyl or aryl, or a heterocyclic compound residue of 6 to 20 carbon atoms, preferably an alkyl group of 1 to 12 carbon atoms, a phenyl group, a naphthyl group, a 6-membered heterocyclic ring containing one hetero atom, a benzologue of a 5-membered heterocyclic ring containing two hetero atoms (said benzologue means a condensed ring compound having a structure in which the 5-membered heterocyclic ring containing two hetero atoms is condensed with one or more benzene ring(s) or a benzologue condensed ring of a 6-membered heterocyclic ring containing three hetero atoms; M is a hydrogen atom or an alkali metal atom, preferably a lithium, sodium or potassium atom; A, A' and A'' may be the same or different and are each a carboxyl group, a hydroxyl group, a substituted or non-substituted amino group or a nitro group; x, x' and x'' may be the same or different and are each an integer of 0 to 6; and y is an integer of 1 to 6), and, as necessary, a base, in a solvent capable of dissolving the PPS, at 100° C. to 350° C.

Owing to the above heat treatment, a PPS can be obtained that is substantially free from ionically bonded chlorine and sodium and containing covalently bonded chlorine in a reduced amount of 500 ppm or less, or even 100 ppm or less. "Substantially free from ionically bonded chlorine" implies that the ionically bonded chlorine content in PPS is about 100 ppm or less and the ionically bonded sodium content is about 400 ppm or less.

Examples of the organic, sulfur-containing compound of the general formula (I) usable in the present invention include thiophenol, o-thiocresol, m-thiocresol, p-thiocresol, 1-naphthalenethiol, 2-naphthalenethiol, 3,4-dimercaptotoluene, 1-hexanethiol, 1-heptanethiol, 1-octanethiol, mercaptocyclopentane, mercaptocyclohexane, mercaptoacetic acid, alpha-mercaptopropionic acid, betamercaptopropionic acid, mercaptosuccinic acid, thiosalicyclic acid, 2-mercaptoethanol, 3-mercapto-2-butanol, 3-mercapto1,2,-propanediol, 2-mercaptoethylamine, beta-mercaptovaline, 2-mercaptobenzimidazole, 2-mercaptobenzothiazole, 2-mercaptobenzoxazole, 2-mercapto-1-methyltetrazole, 2-mercapto-4-methylpyrimidine, 2-mercapto-4,6-dimethylpyrimidine, 5-mercapto-1-methyltetrazole, 3-mercapto-4-methyl-4H-1,2,4-triazole, 2-mercaptonicotinic acid, 6-mercaptopurine, 2-mercapto-6-hydroxypurine, 6-mercapto-2-aminopurine, 2-mercaptopyridine, 4-mercaptopyridine, 2-mercaptopyridine-N-oxide, 2-mercaptothiazoline, 3-mercapto-1H-1,2,4-triazole, 2,5-dimercapto-1,3,4-thiadiazole, 5-mercapto-2-amino-1,3,4-thiadiazole, 1,3,5-triazine-2,4,6-trithiol, 2-mercaptoimidazoline, 2-mercapto-4-pyrimidone and 2-mercapto-5-thiazolidone. Alkali metal salts of the compounds of the formula (I) are also preferably used in the present invention. Particularly preferable examples of these compounds are thiophenol, 2-mercaptobenzothiazole, 2-mercaptobenzimidazole, 2-mercaptobenzoxazole, 2-mercaptopyridine, thiosalicyclic acid, dimercaptothiadiazole and 1,3,5-triazine-2,4-6-trithiol. Examples of the organic, sulfur-containing compound of the general formula (II) include diphenyl disulfide, 2,2'-diaminodiphenyl disulfide, 3,3'-diaminodiphenyl disulfide, 4,4'-diaminodiphenyl disulfide, dibenzyl disulfide, dithiosalicyclic acid, naphthyl disulfide, dimethyl disulfide, diethyl disulfide, dipropyl disulfide, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole. The organic, sulfur-containing compounds of the formula (I) and (II) are used singly or as a mixture of two or more.

The amount of the organic, sulfur-containing compound(s) or its (their) alkali metal salt(s) used is appropriately 0.05 to 100 mole %, preferably 0.1 to 80 mole %, more preferably 0.5 to 50 mole % for each recurring unit

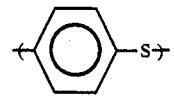

of PPS.

In the present invention, it is also possible for at least one of the above organic, sulfur-containing compounds and a base to be allowed to coexist in the reaction system to form an alkali metal salt of said organic, sulfur-containing compound and for a PPS to be treated with this salt. As preferable forms of such a base, mention can be made of alkali metal hydroxides, alkali metal carbonates, etc. Specific examples of these hydroxides and carbonates include lithium hydroxide, sodium hydroxide, potassium hydroxide, sodium carbonate, potassium carbonate and their mixtures.

The amount of the base used is appropriately 10 to 700 mole % based on the organic, sulfur-containing compound.

The solvent used in the present invention can be any solvent capable of dissolving PPS. Specifically, the solvent can be, for example, N-methylpyrrolidone, N-ethylpyrrolidone, 2-pyrrolidone, N-methylcaprolactam, hexamethylphosphoramide, N,N-dimethylacetamide, N,N-dimethylformamide, acetamide, formamide, 1,3-dimethylimidazolidinone, tetramethylurea, sulfolane, dimethylsulfolane, benzonitrile, methyl phenyl ketone, xylene, naphthalene, diphenyl, anisole, ethyl phenyl ether and diphenyl ether. These solvents can be used singly or in a mixture of two or more. Particularly preferable examples of these solvents are N-methylpyrrolidone and diphenyl ether. The amount of the solvent used is preferably 1 to 100 parts by weight per 1 part by weight of PPS.

The PPS used as a raw material in the present invention has no particular restriction and includes a PPS produced according to the method disclosed in Japanese Patent Publication No. 3368/1970, or an oxidized and crosslinked PPS obtained by subjecting the above PPS to heat treatment in the presence of oxygen, or a PPS of high polymerization degree produced according to the method disclosed in Japanese Patent Publication No. 12240/1977.

The PPS of the present invention containing covalently bonded chlorine in a reduced amount can be produced by stirring a material PPS as mentioned above and at least one organic, sulfur-containing compound or its alkali metal salt as mentioned above in a solvent as mentioned above, ordinarily at 100° to 350° C., preferably 190° to 280° C., more preferably 220° to 260° C., for 0.5 to 10 hours, preferably 1 to 4 hours. The pressure used in the reaction system can be any as long as it is such as to allow the solvent to remain in a liquid phase.

In order to produce a PPS of the present invention containing covalently bonded chlorine in a reduced amount it is advisable to subject a material PPS isolated from its production system and at least one organic, sulfurcontaining compound or its alkali metal salt as mentioned above to heat treatment in a particular solvent as mentioned above. When said organic, sulfur-containing compound or its alkali metal salt is added to a system where a material PPS has been produced, the content of covalently bonded chlorine in said material PPS is not reduced.

The recovery of the PPS of the present invention from the reaction mixture can be conducted according to a conventionally known ordinary method such as a method wherein the solvent is removed by distillation or flushing and the residual polymer is water-washed and recovered or a method wherein the reaction mixture is filtered and the polymer collected is water-washed and recovered.

The thus obtained PPS containing covalently bonded chlorine in a reduced amount can be subjected as it is, or after being mixed with a reinforcing filler (e.g. a glass fiber) or a known inorganic filler (e.g. talc or mica), to injection molding, extrusion molding, etc. to prepare a shaped article, a film, a sheet, a pipe, a fiber, etc. Further, the PPS produced according to the present invention, being substantially free from ionically bonded chlorine and sodium and containing covalently bonded chlorine at an extremely low level, is very useful as a coating or encapsulating material for electrical and electronic components.

EXAMPLES

The present invention will be explained more specifically below by way of Examples. However, the present invention is in no way restricted to these Examples.

The contents of ionically bonded sodium in the PPS's used or produced in Examples and Comparative Examples were measured by (a) subjecting about 0.5 g of a PPS sample to wet decomposition with about 10 ml of sulfuric acid and about 10 ml of nitric acid in a quartz beaker, (b) adding thereto deionized water to prepare a solution of a predetermined amount and then (c) subjecting the solution to atomic absorption spectrometry. The contents of covalently bonded chlorine were measured by (a) converting about 30 mg of a PPS sample to ash by a flask combustion method, (b) allowing a N/100 aqueous sodium hydroxide solution to absorb the ash and adding thereto deionized water to prepare a solution of a predetermined amount, (c) subjecting the solution to ion chromatography to determine the total amount of chlorine, (d) measuring the ratio of covalently bonded chlorine and ionically bonded chlorine according to ESCA (ESCA-750 manufactured by Shimadzu Corp. was used) and (e) calculating, from these values, the content of covalently bonded chlorine in the PPS sample. In the ESCA was used a Mg target as an X-ray source, an energy of 8KV, and 30 mA. The ESCA spectra actually obtained are shown in FIG. 1 and FIG. 2.

Figure 2:
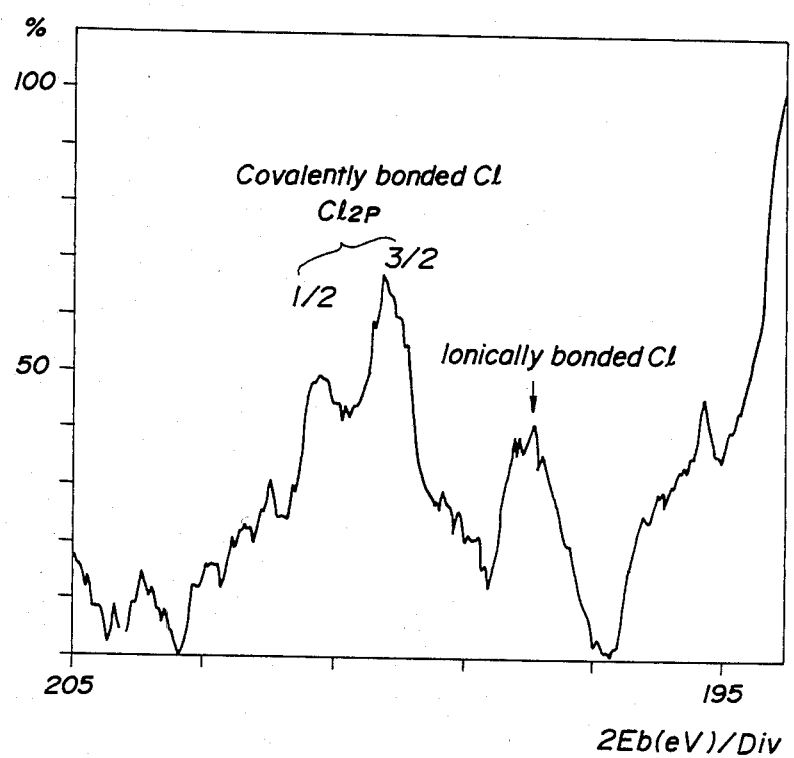
FIG. 2 shows an ESCA spectrum of chlorine (covalently bonded chlorine and ionically bonded chlorine) in a PPS produced according to the present invention.

FIG. 1 shows an ESCA spectrum of chlorine (covalently bonded chlorine and ionically bonded chlorine) in a PPS produced according to a known process and used in Examples as a raw material. FIG. 2 shows an ESCA spectrum of chlorine (covalently bonded chlorine and ionically bonded chlorine) in a PPS produced according to the present invention. As is obvious from FIG. 1 and FIG. 2, the determination of covalently bonded chlorine and ionically bonded chlorine is possible by using ESCA.

The measurement conditions for ESCA were as follows:

Energy at the start of measurement: 210.00 eV
Energy at the completion of measurement: 194.00 eV
Step energy: 0.05 eV
Measurement time: 200 ms
Accumulated times: 25

EXAMPLES 1 TO 17

In a 15-liter autoclave were placed 17.4 moles of $Na_2S \cdot 2.9H_2O$ and 5.8 liters of N-methylpyrrolidone. They were heated to 215° C. with stirring in a nitrogen atmosphere, whereby 549 g of a distillate consisting mainly of water was removed. Then, the system was cooled to 170° C. and 17.4 moles of p-dichlorobenzene was added. The system was closed in a nitrogen atmosphere and heated to 250° C. Polymerization was conducted for 3 hours at that temperature. After the completion of the polymerization, vacuum distillation was conducted to recover N-methylpyrrolidone, and the resulting polymer (PPS) was water-washed, dried and isolated. This polymer weighed 1,790 g and contained ionically bonded sodium, ionically bonded chlorine and covalently bonded chlorine by 2,000 ppm, 2,000 ppm and 2,890 ppm, respectively.

This PPS material, an organic, sulfur-containing compound as shown in Table 1, a solvent as shown in Table 1 and, optionally, sodium hydroxide were fed into a 500-ml autoclave in the amounts respectively shown in Table 1, and they were subjected to reaction at a given temperature as shown in Table 1, for a given period of time, as also shown in Table 1. After the completion of the reaction, the autoclave was cooled and the contents including treated PPS were poured into water. The treated PPS was isolated by conducting repeated hot water washing-filtration, methanol washing and vacuum drying. The results are shown in Table 1.

valently bonded chlorine in the PPS material is little reduced.

COMPARATIVE EXAMPLES 3 AND 4

The PPS material produced in the above Examples according to a known method and an organic, sulfur-containing compound were subjected to a treatment at 200° C. for 2 hours using, as a solvent, water which is incapable of dissolving the PPS. The results are shown in Table 2.

It will be appreciated from Table 2 that in a treatment using a solvent incapable of dissolving a PPS material, neither the content of ionically bonded chlorine and

TABLE 1

| | | | | Treatment conditions | | | | | | |
|---|---|---|---|---|---|---|---|---|---|---|
| | Solvent | | Amount of PPS used (unit mole) | Organic, sulfur-containing compound | | Amount of NaOH used (mole) | Reaction temp. (°C.) | Reaction time (hr.) | Content of ionically bonded chlorine (ppm) | Content of ionically bonded sodium (ppm) | Content of covalently bonded chlorine (ppm) |
| No. | compound description | Amount used (g) | | Compound description | Amount used (mole) | | | | | | |
| Ex. 1 | NMP*1 | 200 | 0.185 | 1-OT*3 | 0.028 | 0.028 | 190 | 2 | 120 | 390 | 440 |
| Ex. 2 | Same as above | 200 | 0.185 | Th*4 | 0.028 | 0.028 | 200 | 2 | <100 | 74 | 120 |
| Ex. 3 | Same as above | 200 | 0.185 | 2-MBT*5 | 0.028 | 0.028 | 220 | 1 | 110 | 12 | 420 |
| Ex. 4 | Same as above | 200 | 0.185 | TT*6 | 0.028 | 0.028 | 240 | 2 | <100 | 300 | 140 |
| Ex. 5 | Same as above | 200 | 0.185 | 2-MBI*7 | 0.028 | 0.028 | 240 | 2 | <100 | 96 | 100 |
| Ex. 6 | Same as above | 200 | 0.185 | 2-MBTNa*8 | 0.028 | 0 | 240 | 2 | <100 | 14 | 150 |
| Ex. 7 | Same as above | 200 | 0.185 | 2-MBO*9 | 0.028 | 0.028 | 240 | 2 | <100 | <10 | 200 |
| Ex. 8 | Same as above | 200 | 0.185 | 2-MPy*10 | 0.028 | 0.028 | 240 | 2 | <100 | 320 | 320 |
| Ex. 9 | Same as above | 200 | 0.185 | TSA*11 | 0.028 | 0.056 | 240 | 2 | <100 | 26 | <100 |
| Ex. 10 | NMP | 200 | 0.185 | DMTA*12 | 0.028 | 0.028 | 240 | 2 | <100 | 37 | 200 |
| Ex. 11 | Same as above | 200 | 0.185 | 2-MBI | 0.028 | 0.028 | 260 | 2 | 100 | 45 | <100 |
| Ex. 12 | Same as above | 200 | 0.185 | 2-MBI | 0.028 | 0 | 260 | 2 | <100 | <10 | 290 |
| Ex. 13 | Same as above | 200 | 0.185 | 2-MBI | 0.009 | 0.009 | 240 | 2 | <100 | 58 | 290 |
| Ex. 14 | Same as above | 200 | 0.185 | 2-MBI | 0.003 | 0.003 | 240 | 2 | <100 | <10 | 490 |
| Ex. 15 | Same as above | 200 | 0.741 | 2-MBI | 0.111 | 0.111 | 260 | 2 | <100 | 92 | <100 |
| Ex. 16 | Same as above | 200 | 0.741 | 2-MBI | 0.037 | 0.037 | 260 | 1 | <100 | 50 | <100 |
| Ex. 17 | DPE*2 | 200 | 0.185 | 2-MBI | 0.028 | 0.028 | 240 | 2 | <100 | 80 | 120 |

*1 NMP: N—methylpyrrolidone
*2 DPE: Diphenyl ether
*3 1-OT: 1-Octanethiol
*4 Th: Thiophenol
*5 2-MBT: 2-Mercaptobenzothiazole
*6 TT: 1,3,5-Triazine-2,4,6-trithiol
*7 2-MBI: 2-Mercaptobenzimidazole
*8 2-MBTNa: Sodium salt of 2-mercaptobenzothiazole
*9 2-MBO: 2-Mercaptobenzoxazole
*10 2-MPy: 2-Mercaptopyridine
*11 TSA: Thiosalicylic acid
*12 DMTA: 2,5-Dimercapto-1,3,4-thiadiazole

COMPARATIVE EXAMPLES 1 AND 2

The PPS material produced in the above Examples according to a known method and a solvent were subjected to a treatment for 240° C. and 2 hours using no organic, sulfurcontaining compound. The results are shown in Table 2.

It will be appreciated from Table 2 that in a treatment using no organic, sulfur-containing compound, the content of ionically bonded chlorine and sodium in PPS material is substantially reduced but the content of co-valently bonded chlorine in the PPS material is substantially reduced.

COMPARATIVE EXAMPLE 5

In a 500-ml autoclave were placed 0.6 mole of $Na_2S \cdot 9H_2O$ and 150 ml of N-methylpyrrolidone. They were heated to 215° C. with stirring in a nitrogen atmosphere, whereby 22.9 of a distillate consisting mainly of water was removed. Then, the system was cooled to 170° C. and 0.6 mole of p-dichlorobenzene was added together with 50 ml of N-methylpyrrolidone. The system was closed in a nitrogen atmosphere and heated to 250° C. Polymerization was conducted for 3 hours at that temperature. To the polymerization system was added, as an organic, sulfur-containing compound, 0.06 mole of a sodium salt of 2-mercaptobenzimidazole dissolved in N-methylpyrrolidone. Reaction was conducted at 250° C. for 30 minutes. Subsequently, the reaction system was cooled and the reaction mixture was poured into water. The solid substance was collected by filtration and washed repeatedly with hot water to isolate a polymer (a treated PPS). The polymer weighed 61.2 g and contained ionically bonded chlorine, ionically bonded sodium and covalently bonded chlorine by 210 ppm, 220 ppm and 1,840 ppm, respectively.

Thus, addition of an organic, sulfur-containing compound to a PPS polymerization system does not attain any significant reduction of covalently bonded chlorine in the PPS.

resulting polymer (PPS) was water-washed, dried and isolated. This polymer weighed 1,790 g and contained ionically bonded sodium, ionically bonded chlorine and covalently bonded chlorine by 2,000 ppm, 2,000 ppm and 2,890 ppm, respectively.

This PPS material, an organic, sulfur-containing compound as shown in Table 3, a solvent as shown in Table 3 and, optionally, sodium hydroxide were fed into a 500-ml autoclave in the amounts respectively shown in Table 3, and they were subjected to reaction at a given temperature as shown in Table 3, for a given period of time, as also shown in Table 3. After the completion of the reaction, the autoclave was cooled and the contents including treated PPS were poured into water. The treated PPS was isolated by conducting repeated hot water washing-filtration, methanol washing and vacuum drying. The results are shown in Table 3.

TABLE 3

| | Treatment conditions | | | | | | | | | |
|---|---|---|---|---|---|---|---|---|---|---|
| | Solvent | | Amount of PPS used (unit mole) | Organic, sulfur-containing compound | | Amount of NaOH used (mole) | Reaction temp. (°C.) | Reaction time (hr.) | Content of ionically bonded chlorine (ppm) | Content of ionically bonded sodium (ppm) | Content of covalently bonded chlorine (ppm) |
| No. | compound description | Amount used (g) | | Compound description | Amount used (mole) | | | | | | |
| Ex. 18 | NMP*1 | 200 | 0.185 | DPDS*3 | 0.028 | 0.028 | 200 | 2 | <100 | 16 | <100 |
| Ex. 19 | Same as above | 200 | 0.185 | DPDS | 0.028 | 0 | 200 | 2 | <100 | 44 | 210 |
| Ex. 20 | Same as above | 200 | 0.185 | DTSA*4 | 0.028 | 0.028 | 220 | 2 | <100 | 56 | 140 |
| Ex. 21 | Same as above | 200 | 0.185 | DTPy*5 | 0.028 | 0.028 | 220 | 2 | <100 | 82 | 250 |
| Ex. 22 | Same as above | 200 | 0.185 | DTBT*6 | 0.028 | 0.028 | 220 | 2 | <100 | 34 | 280 |
| Ex. 23 | DPE*2 | 200 | 0.185 | DPDS | 0.028 | 0.028 | 220 | 2 | <100 | 21 | 300 |

*1NMP: N—methylpyrrolidone
*2DPE: Diphenyl ether
*3DPDS: Diphenyl disulfide
*4DTSA: Dithiosalicylic acid
*5DTPy: 3,3'-Dithiopyridine
*6DTBT: 2,2'-Dithiobis(benzothiazole)

TABLE 2

| | Treatment conditions | | | | | | | | | |
|---|---|---|---|---|---|---|---|---|---|---|
| | Solvent | | Amount of PPS used (unit mole) | Organic, sulfur-containing compound | | Amount of NaOH used (mole) | Reaction temp. (°C.) | Reaction time (hr.) | Content of ionically bonded chlorine (ppm) | Content of ionically bonded sodium (ppm) | Content of covalently bonded chlorine (ppm) |
| No. | compound description | Amount used (g) | | Compound description | Amount used (mole) | | | | | | |
| Comp. Ex. 1 | NMP | 200 | 0.185 | — | 0 | 0 | 240 | 2 | <100 | 11 | 2000 |
| Comp. Ex. 2 | DPE | 200 | 0.185 | — | 0 | 0 | 240 | 2 | <100 | 120 | 2600 |
| Comp. Ex. 3 | H2O | 200 | 0.185 | 2-MBTNa | 0.028 | 0 | 200 | 2 | 700 | 1300 | 1250 |
| Comp. Ex. 4 | H2O | 200 | 0.185 | 2-MBI | 0.028 | 0.028 | 200 | 2 | 600 | 1100 | 1330 |

EXAMPLES 18 TO 23

In a 15-liter autoclave were placed 17.4 moles of $Na_2S \cdot 2.9H_2O$ and 5.8 liters of N-methylpyrrolidone. They were heated to 215° C. with stirring in a nitrogen atmosphere, where 549 g of a distillate consisting mainly of water was removed. Then, the system was cooled to 170° C. and 17.4 moles of p-dichlorobenzene was added. The system was closed in a nitrogen atmosphere and heated to 250° C. Polymerization was conducted for 3 hours at that temperature. After the completion of the polymerization, vacuum distillation was conducted to recover N-methylpyrrolidone, and the

COMPARATIVE EXAMPLES 6 AND 7

The PPS material produced in the above Examples according to a known method and a solvent were subjected to a treatment at 240° C. for 2 hours using no organic, sulfur-containing compound. The results are shown in Table 4.

It will be appreciated from Table 4 that in a treatment using no organic, sulfur-containing compound, the content of ionically bonded chlorine and sodium in PPS material is substantially reduced but the content of covalently bonded chlorine in the PPS material is little reduced.

COMPARATIVE EXAMPLE 8

The PPS material produced in the above Examples according to a known method and an organic, sulfur-containing compound were subjected to a treatment at 200° C. for 2 hours using, as a solvent, water which is incapable of dissolving the PPS. The results are shown in Table 4.

It will be appreciated from Table 4 that in a treatment using a solvent incapable of dissolving a PPS material, neither the content of ionically bonded chlorine and sodium in the PPS material nor the content of covalently bonded chlorine in the PPS material is substantially reduced.

isolated. This polymer weighed 1,490 g, had a melt viscosity of 210 poises and contained 2,200 ppm of ionically bonded sodium and 2,900 ppm of covalently bonded chlorine.

1,400 g of this material PPS, 0.65 mole of 2-mercaptobenzimidazole, 0.65 mole of NaOH and 5.0 liters of N-methylpyrrolidone were fed into a 15-liter autoclave. The autoclave inside was purged with nitrogen. The autoclave contents were heated to 260° C. and reaction was conducted at that temperature for 1 hour. After the completion of the reaction, vacuum distillation was conducted to recover N-methylpyrrolidone. Then, to the residue was added water and the polymer formed was washed for 4 hours at 200° C., dried and isolated. The polymer (treated PPS) thus obtained weighed 1,300 g, had a melt viscosity of 204 poises and contained

TABLE 4

| No. | Treatment conditions | | | | | | | | | |
|---|---|---|---|---|---|---|---|---|---|---|
| | Solvent | | Amount of PPS used (unit mole) | Organic, sulfur-containing compound | | Amount of NaOH used (mole) | Reaction temp. (°C.) | Reaction time (hr.) | Content of ionically bonded chlorine (ppm) | Content of ionically bonded sodium (ppm) | Content of covalently bonded chlorine (ppm) |
| | compound description | Amount used (g) | | Compound description | amount used (mole) | | | | | | |
| Comp. Ex. 6 | NMP | 200 | 0.185 | — | 0 | 0 | 240 | 2 | <100 | 11 | 2000 |
| Comp. Ex. 7 | DPE | 200 | 0.185 | — | 0 | 0 | 240 | 2 | <100 | 120 | 2600 |
| Comp. Ex. 8 | H$_2$O | 200 | 0.185 | DPDS | 0.028 | 0.028 | 200 | 2 | 650 | 1600 | 1570 |

COMPARATIVE EXAMPLE 9

In a 500-ml autoclave were placed 0.6 mole of Na$_2$S·2.9H$_2$O and 150 ml of N-methylpyrrolidone. They were heated to 215° C. with stirring in a nitrogen atmosphere, whereby 22.9 g of a distillate consisting mainly of water was removed. Then, the system was cooled to 170° C. and 0.6 mole of p-dichlorobenzene was added together with 50 ml of N-methylpyrrolidone. The system was closed in a nitirogen atmosphere and heated to 250° C. Polymerization was conducted for 3 hours at that temperature. To the polymerization system was added, as an organic, sulfur-containing compound, 0.02 mole of diphenyl disulfide dissolved in N-methylpyrrolidone. Reaction was conducted at 250° C. for 30 minutes. Subsequently, the reaction system was cooled and the reaction mixture was poured into water. The solid substance was collected by filtration and washed repeatedly with hot water to isolate a polymer (a treated PPS). The polymer weighed 60.1 g and contained ionically bonded sodium and covalently bonded chlorine in amounts of 240 ppm and 1,940 ppm, respectively.

Thus, addition of an organic, sulfur-containing compound to a PPS polymerization system does not attain significant reduction of covalently bonded chlorine in the PPS. pcl EXAMPLE 24

In a 15-liter autoclave were placed 14.6 moles of Na$_2$S·2.9H$_2$O and 4.9 liters of N-methylpyrrolidone. They were heated to 210° C. with stirring in a nitrogen atmosphere, whereby 340 g of a distillate consisting mainly of water was removed. Then, the system was cooled to 170° C. and 14.5 moles of p-dichlorobenzene was added. The system was closed in a nitrogen atmosphere and heated to 250° C. Polymerization was conducted for 3 hours at that temperature. After the completion of the polymerization, vacuum distillation was conducted to recover N-methylpyrrolidone, and the resulting polymer (PPS) was water-washed, dried and 56 ppm of ionically bonded sodium and lower than 100 ppm of covalently bonded chlorine.

This PPS was subjected to heat treatment of 260° C. and 3 hours in the presence of oxygen. The PPS after heat treatment had a melt viscosity of 3,070 poises. Sixty parts by weight of the heat-treated PPS and 40 parts by weight of a glass fiber (chopped strands of 13 μm in diameter and 3 mm in length) were uniformly mixed in a V blender. The resulting mixture was extruded through an extruder having a screw diameter of 40 mm at a cylinder temperature of 310° C. to obtain pellets. The pellets were injected into a mold containing aluminum inserts, using an injection molder under the conditions of 310° C. (cylinder temperature), 800 kg/cm$^2$ (injection pressure) and 135° C. (mold temperature).

From the molding obtained were taken out 10 samples at random. These samples were allowed to stand for 1,000 hours in an atmosphere of 80° C. and 95% RH and then the corrosion of aluminum inserts was examined. As a result, no aluminum insert corrosion was seen in any of the 10 samples.

EXAMPLE 25

Polymerization was conducted in the same manner as in Example 24 to obtain 1,520 g of a PPS having a melt viscosity of 230 poises and containing 2,400 ppm of ionically bonded sodium and 3,000 ppm of covalently bonded chlorine. 1,400 g of this PPS, 0.65 mole of diphenyl disulfide, 0.65 mole of NaOH and 5.0 liters of N-methylpyrrolidone were fed into a 15-liter autoclave. The autoclave inside was purged with nitrogen and the autoclave contents were heated to 200° C. Reaction was conducted for 2 hours at that temperature. After the completion of the reaction, water was added and the polymer formed was washed for 4 hours at 200° C., dried and isolated. The polymer (treated PPS) thus obtained weighed 1,300 g, had a melt viscosity of 105 poises and contained 23 ppm of ionically bonded sodium and lower than 100 ppm of covalently bonded chlorine.

This PPS was subjected to heat treatment of 260° C. and 4 hours in the presence of oxygen. The PPS after heat treatment had a melt viscosity of 3,140 poises. Sixty parts by weight of the heat-treated PPS and 40 parts by weight of a glass fiber (chopped strands of 13 μm in diameter and 3 mm in length) were mixed and then pelletized in the same manner as in Example 24. The pellets obtained were subjected to insert molding in the same manner as in Example 24. On the molding obtained, moisture resistance test was conducted under the same conditions as in Example 24. As a result, no aluminum insert corrosion was seen in any of the 10 samples.

COMPARATIVE EXAMPLE 10

Polymerization was conducted in the same manner as in Example 24 to obtain 1,500 g of a PPS having a melt viscosity of 210 poises and containing 2,000 ppm of ionically bonded sodium and 2,800 ppm of covalently bonded chlorine. This PPS was subjected to heat treatment of 260° C. and 3 hours in the presence of oxygen. The PPS after heat treatment had a melt viscosity of 3,140 poises. Sixty parts by weight of the heat-treated PPS and 40 parts by weight of a glass fiber (chopped strands of 13 μm in diameter and 3 mm in length) were mixed and then pelletized in the same manner as in Example 24. The pellets obtained were subjected to insert molding in the same manner as in Example 24. On the molding obtained, moisture resistance test was conducted under the same conditions as in Example 24. As a result, aluminum insert corrosion was seen in all of the 10 samples.

Separately, the respective pellets obtained in Example 24, Example 25 and Comparative Example 10 were subjected to injection molding to prepare discs each of 50 mm in diameter and 3 mm in thickness. These discs were immersed in hot water of 120° C. for 96 hours and their volume resistivities were measured. The results are shown in Table 5.

In Table 5 are also shown the results of the above corrosion tests for aluminum inserts.

TABLE 5

| No. | Volume resistivity (Ω · cm) | | Number of samples which showed corrosion*2 |
|---|---|---|---|
| | Before immersion | After immersion*1 | |
| Example 24 | $5 \times 10^{16}$ | $1 \times 10^{16}$ | 0 |
| Example 25 | $6 \times 10^{16}$ | $2 \times 10^{16}$ | 0 |
| Comparative Example 10 | $7 \times 10^{15}$ | $2 \times 10^{13}$ | 10 |

*1Measured after immersion in 120° C. hot water for 96 hours.
*2Number of samples which showed corrosion, out of total 10 samples.

As is obvious from the above results, the high modified PPS of the present invention shows little reduction in volume resistivity under hot and humid conditions and causes no aluminum corrosion. Accordingly, the PPS is very useful as a coating or encapsulating material for electrical and electronic components.

What is claimed is:

1. A polyphenylene sulfide consisting of at least 90 mole % of a first moiety represented by

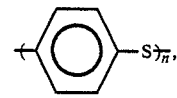

wherein n is an integer of at least 20, and the remainder being of a second moiety wherein said second moiety is a copolymerizable component selected from the group consisting of o- or m- phenylene group, biphenylene group, naphthalene group, tri- or tetra-valent phenylene group, which contains covalently bonded chlorine in an amount of 500 ppm or less and is substantially free from ionically bonded chlorine and sodium.

2. The polyphenylene sulfide according to claim 1 wherein n is 20 to 500.

* * * * *